Nov. 15, 1955 — L. C. BOUMA — 2,723,486
ANIMAL TRAP
Filed Nov. 3, 1952
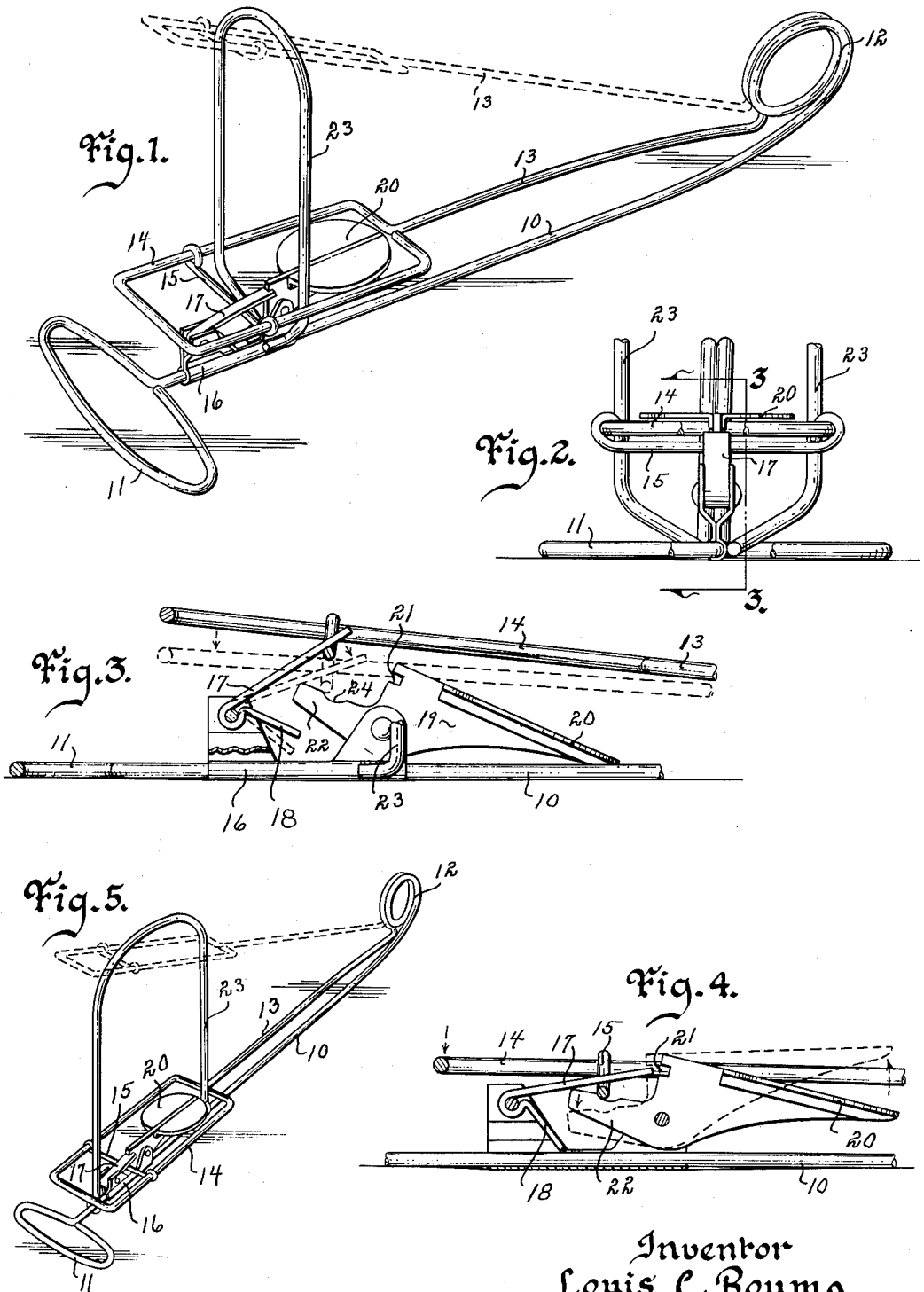
Inventor
Louis C. Bouma
by Talbert Dick & Adler
Attorneys
Witness
Edward P. Seeley 2,723,486
Patented Nov. 15, 1955

2,723,486
ANIMAL TRAP
Louis C. Bouma, Lynnville, Iowa

Application November 3, 1952, Serial No. 318,449

4 Claims. (Cl. 43—85)

This invention relates to traps and more specifically to traps that not only catch the animal but kill the animal quickly.

The most common animal trap is the familiar "jaw" type wherein the jaws are spring loaded and when the trigger mechanism is depressed the jaws close around one or more of the animal's legs. The objection to such traps is that the animal is not killed and, therefore, is often able to pull its leg from the trap or sever the leg and thus free itself, depriving the trapper of a valuable pelt. Furthermore, such traps cause great suffering to the animal caught therein.

Therefore, the principal object of my invention is to provide an animal trap that quickly kills the animal as well as catches it.

A further object of this invention is to provide an animal trap that is easily and quickly set.

A still further object of my invention is to provide an animal trap that raises the caught animal sufficiently above the ground surface to prevent the animal's feet from securing effective traction with the ground surface.

A still further object of my invention is to provide an animal trap that is economical in manufacture, durable in use, and refined in appearance.

These and other objects will be apparent to those skilled in the art.

My invention consists in the construction, arrangement and combination of the various parts of the device, whereby the objects contemplated are attained as hereinafter more fully set forth, and specifically pointed out in my claims, and illustrated in the accompanying drawings, in which:

Fig. 1 is a perspective view of my trap in cocked condition,

Fig. 2 is an enlarged front end view of the trap with its upper portion cut away, Fig. 3 is a side sectional view of the trigger mechanism taken on line 3—3 of Fig. 2, Fig. 4 is an enlarged side sectional view of the trigger mechanism in set condition, and Fig. 5 is a perspective view of my trap with the animal holding bail positioned at a right angle from the position of the bail shown in Fig. 1.

Referring to the drawings in detail, I have used the numeral 10 to designate the base rod of the trap and of spring material. This rod is formed into a horizontal loop 11 at its forward end to provide a platform for maintaining the equilibrium of the trap. The other end portion of the rod is coiled to form the spring 12 after which it extends forwardly above the portion 10 to form the arm 13, and formed on the free end is the rectangular horizontal loop 14. This rectangular loop portion 14 (when the trap is cocked) loosely encircles the trigger mechanism as shown in Fig. 1. The numeral 15 designates a cross bar on the rectangular loop and which extends transversely of the longitudinal axis of the trap.

The numeral 16 designates a bearing member rigidly secured to the forward end portion of the base rod 10 and is positioned symmetrically to a vertical plane drawn through the longitudinal axis of the rectangular loop when the trap is in set condition. The numeral 17 designates a sear bar arm pivoted on the forward portion of the bearing 16 for vertical hinging action. This sear also has a prong 18 located below its contact arm portion and which extends downwardly and rearwardly as shown in Fig. 3. The numeral 19 generally designates the trigger member pivoted for vertical hinging action on the rear end portion of the bearing member 16. This trigger means has a platform 20 on its rear end portion and a notch 21 forward of its platform 20. The free end of the sear arm is designed to enter and engage the notch 21 for holding the trap in cocked position. The numeral 22 designates a forwardly extending finger on the trigger means capable of engaging the prong 18 when lowered, thereby moving the sear arm into the notch 21, as the platform 20 moves upwardly to a horizontal position. The numeral 23 designates a bail loop of rod material operatively rigidly secured to the base rod 10. This bail loop as shown in Fig. 1 extends upwardly within the rectangular loop 14, to a height substantially above the loop 14 when the loop 14 is in a cocked position and with its width extending transversely of the longitudinal axis of the trap and the elongated rectangular loop. In Fig. 5 I show this bail loop extending parallel to the longitudinal axis of the trap for catching animals approaching the trap from the side and when the trap is so placed for this type of operation. In the construction shown in Fig. 1, the animal would be caught longitudinally of the trap.

The operation of the trap is as follows: With the trap sprung, thhe coil spring 12 will yieldingly hold the arm 13 and loop 14 in an elevated position as shown by dotted lines of Figs. 1 and 5. To set the trap, the arm and loop 14 are manually depressed and the sear arm 17 placed above the cross bar 15 as shown in Fig. 3. By the further depressing of the loop 14, the cross bar 15 will contact and depress the finger 22, thereby raising the trap platform 20. Also, the lowering of the finger 22 will cause it to engage and depress the lug 18 of the sear, thereby lowering the sear arm into the trigger notch 21. The movement of these parts into proper engagement is synchronized by the depression 24 in the top of the finger and which is finally engaged and entered by the cross bar thereby slowing down the relative speed of the trigger as the sear enters the notch 21. With the sear arm engaging the notch 21, and with the cross bar under the same, the spring loaded loop 14 will be held in a lowered set position. Thus it will be seen that my trigger mechanism is substantially self-setting merely by depressing the arm and loop 14. Obviously if an animal steps upon and depresses the platform 20, the notch will be pulled from the sear arm 17, and with this arm free for upward movement the loop 14 will spring upwardly thereby wedging the animal between the loop 14 or its cross bar 15 and the retaining bail 23. This clamping action will usually be around the body, neck, or head of the animal, instantly killing the same. Furthermore, the entire body of the animal will be elevated and at least two of its feet will be out of contact with the ground, thus reducing any undue struggling of the animal. To release the caught animal it is merely necessary to lower the spring arm 13. If desired, a plurality of retaining bails 23 may be used on a given trap and arranged either transversely longitudinally of the trap.

It is submitted that the invention shown and described is aptly suited to achieve the purposes intended and is characterized by a combination of highly useful and mutually cooperating elements that combine their respective and proportionate functions in accomplishing the objects sought to be obtained.

Some changes may be made in the construction and arrangement of my animal trap without departing from the real spirit and purpose of my invention, and it is my intention to cover by my claims, any modified forms of structure or use of mechanical equivalents which may be reasonably included within their scope.

I claim:

1. In a trap, a base portion, a vertical bail loop mounted on said base portion, an arm connected to said base portion, spring means for yieldingly holding said arm in an upward position relative to said base portion, said arm being formed with a substantially horizontal loop loosely surrounding said bail, a sear having an arm pivotally mounted on said base portion, and a trigger platform pivotally mounted on said base portion having a notch formed therein capable of being engaged by said sear arm, said trigger platform having a finger portion extending towards said sear, said sear having a projecting prong portion capable of being engaged and depressed by said finger portion when said finger is moved downwardly.

2. In a trap, a base portion, a vertical bail loop mounted on said base portion, an arm connected to said base portion, spring means for yieldingly holding said arm in an upward position relative to said base portion, said arm being formed with a substantially horizontal loop loosely surrounding said bail, a sear having an arm pivotally mounted on said base portion, a trigger platform pivotally mounted on said base portion having a notch formed therein capable of being engaged by said sear arm, a cross bar on the looped portion of said arm capable of engaging one side of said sear arm when the same is in engagement with said notch, thereby holding the looped portion of said arm against the yielding action of said spring means, and a finger portion on said trigger platform capable of being engaged and depressed by said cross bar when the same is lowered for moving the notch of said trigger platform into engagement with said sear arm, said finger portion having a recessed portion to receive said cross bar.

3. In a trap, a base portion, a vertical bail loop mount on said base portion, an arm connected to said base portion, spring means for yielding holding said arm in an upward position relative to said base portion, said arm being formed with a substantially horizontal loop loosely surrounding said bail, a sear having an arm pivotally mounted on said base portion, a trigger platform pivotally mounted on said base portion having a notch formed therein capable of being engaged by said sear arm, a cross bar on the looped portion of said arm capable of engaging one side of said sear arm when the same is in engagement with said notch, thereby holding the looped portion of said arm against the yielding action of said spring means, a finger portion on said trigger platform capable of being engaged and depressed by said cross bar when the same is lowered for moving the notch of said trigger platform into engagement with said sear arm, and a projecting prong portion on said sear capable of being engaged and depressed by said finger when said finger is moved downwardly.

4. In a trap, a spring rod member having a base portion formed with a loop at one end adapted to engage a supporting surface and a coil formed at its other end, an arm extending back over the base portion having a loop formed on the free end thereof, said coil acting as a spring means for yieldingly holding said arm away from the base portion, an upright bail member mounted on said base portion loosely enclosed by said loop on the free end of said arm when said arm is moved against the force of the spring coil into set position adjacent said base portion, a sear having an arm pivotally mounted on said base portion, a trigger platform pivotally mounted on said base portion having a notch formed therein capable of being engaged by said sear arm, said trigger platform having a finger portion extending towards said sears, said sear having a projecting prong portion capable of being engaged and depressed by said finger when said finger is moved downwardly, and a cross bar on the looped portion of said arm capable of engaging one side of said sear arm when the same is in engagement with said notch, thereby holding the looped portion of said arm against the yielding action of said spring means.

References Cited in the file of this patent

UNITED STATES PATENTS

| 157,973 | Richardson | Dec. 22, 1874 |
| 218,532 | Hooker | Aug. 12, 1879 |
| 1,494,918 | Kleinpeter | May 20, 1924 |
| 1,726,694 | Cooper | Sept. 3, 1929 |
| 1,881,871 | Nerby | Oct. 11, 1932 |

FOREIGN PATENTS

| 364,029 | Great Britain | 1931 |